United States Patent [19]

Shurman

[11] Patent Number: 4,809,757
[45] Date of Patent: Mar. 7, 1989

[54] CURB SCUFF PROTECTION FOR TIRE SIDEWALL

[75] Inventor: Louis W. Shurman, Canton, Ohio

[73] Assignee: The Firestone Tire & Rubber Company, Akron, Ohio

[21] Appl. No.: 54,710

[22] Filed: May 27, 1987

Related U.S. Application Data

[63] Continuation-in-part of Ser. No. 766,385, Aug. 7, 1985, Pat. No. 4,699,193.

[51] Int. Cl.$^4$ .................. B60C 13/02; B60C 13/04
[52] U.S. Cl. ........................... 152/523; 152/524
[58] Field of Search ............... 152/523, 524, DIG. 12; 156/116

[56]  References Cited

U.S. PATENT DOCUMENTS

| | | | |
|---|---|---|---|
| 3,073,371 | 1/1963 | Leeper | 152/330 |
| 3,113,902 | 12/1963 | Dismuke | 156/416 |
| 3,280,427 | 10/1966 | Smith | 18/13 |
| 3,285,314 | 11/1966 | Roberts | 152/523 |
| 3,382,120 | 5/1968 | Rudder | 156/116 |
| 3,449,201 | 6/1969 | Palmquist et al. | 152/523 X |
| 3,638,704 | 2/1972 | Boileau | 152/523 |
| 3,648,748 | 3/1972 | Lovell | 152/523 |
| 3,729,041 | 4/1973 | Kubota | 152/DIG. 12 X |
| 3,764,455 | 10/1973 | Lovell et al. | 161/162 |
| 3,830,274 | 8/1974 | Waser, Jr. | 156/116 X |
| 4,019,945 | 4/1977 | Look et al. | 156/116 |
| 4,038,256 | 7/1977 | Finelli et al. | 260/75 NH |
| 4,072,645 | 2/1978 | Cogley, Jr. | 260/29.7 M |
| 4,170,503 | 10/1979 | Buchanan et al. | 156/116 |
| 4,182,393 | 1/1980 | Larson et al. | 152/DIG. 12 X |
| 4,219,066 | 8/1980 | Tamura et al. | 152/523 |
| 4,237,173 | 12/1980 | Kuan | 428/65 |
| 4,256,159 | 3/1981 | Williams | 152/523 |
| 4,259,227 | 3/1981 | Ojakaar | 156/116 |
| 4,279,286 | 7/1981 | Merli et al. | 152/523 |
| 4,317,479 | 3/1982 | McDonald | 152/523 |
| 4,318,436 | 3/1982 | Shurman | 152/523 |
| 4,343,342 | 8/1982 | McDonald | 152/523 |
| 4,699,193 | 10/1987 | Bryant et al. | 152/523 |

FOREIGN PATENT DOCUMENTS

| | | | |
|---|---|---|---|
| 0485441 | 8/1952 | Canada | 152/523 |
| 55-91408 | 7/1980 | Japan | 152/523 |

Primary Examiner—Michael W. Ball
Assistant Examiner—Ramon R. Hoch
Attorney, Agent, or Firm—Daniel N. Hall

[57] ABSTRACT

A pneumatic tire having a decorative applique on the sidewall thereof. The applique is protected from damage when the sidewall is curbed by the provision of a rib concentric with the applique and interposed upon the sidewall between the applique and the tire tread. A decoupling groove interconnects the applique and the rib and allows the portion of the sidewall maintaining the applique to decouple from the remainder of the sidewall, deflecting inwardly when the sidewall makes contacting engagement with a vertical surface such as a curb. The deflection of the applique prevents contact with the curb and allows the rib to draw inwardly and over the outer edge of the applique, further protecting it from scuffing action. The decoupling groove may undercut the rib to be hidden from view. Further, a rib may be provided about the applique between the tire bead and applique to protect the applique in manufacture and handling.

10 Claims, 3 Drawing Sheets

CURB SCUFF PROTECTION FOR TIRE SIDEWALL

CROSS-REFERENCE TO RELATED APPLICATION

This is a continuation-in-part application of copending patent application Ser. No. 766,385, filed Aug. 7, 1985, for "Curb Scuff Protection For Tire Sidewall," now U.S. Pat. No. 4,699,193.

TECHNICAL FIELD

The invention herein resides in the art of pneumatic vehicle tires and, more particularly, to such tires having decorative appliques on the sidewall thereof. Specifically, the invention relates to a sidewall design in a pneumatic tire which allows for protection of a sidewall applique from scuffing when the sidewall of the tire comes into contact with a substantial vertical surface.

BACKGROUND OF THE INVENTION

Decorative sidewalls for vehicle tires have been well received by the consuming public. Typically, these decorative sidewalls include a white or light colored applique circumferentially positioned about the sidewall. A particular type of such tire has become generically known as a "white sidewall" tire. Tires having such decorative appliques are given to damage by curbing, rotation of the sidewall of the tire against a substantial vertical surface such as a road curb. Such contact generally results in a scraping or scuffing of the decorative surface, substantially impairing the decorative appearance thereof. In the case of tires having sidewall bands thereon which consist of an extrudate of white or colored rubber, the scuff will typically not be totally destructive of the decorative applique. This is due to the fact that the decorative extrudate has a somewhat substantial thickness and is protected at the edges by a layer of black rubber resulting from the manufacturing process. While not totally destructive, the appearance of the decorative sidewall may be permanently impaired.

Copending patent application Ser. No. 766,227, filed Aug. 16, 1985, assigned to the Firestone Tire & Rubber Company, the assignee of the instant application, presents a tire which includes a decorative applique in the form of a thin decal. As taught by that application, the decal is in the form of a thin layer of polymeric paint which is transferred to the tire during the curing process. The polymeric paint layer is extremely thin, on the order of 0.003 inch, such that scuffs imparted to the applique can be extremely damaging, to the point of actually removing the scuffed area of the applique. Further, the edges of the applique as taught by this application are not protected by an overlapping layer of black rubber and, accordingly, the edges themselves may be exposed to the damaging effects of the vertical curb surface. Such contact can have the detrimental effect of actually "peeling" the applique from the tire. Indeed, the edges of such appliques must be protected in the manufacture and handling of the tire.

It has previously been known to provide curb ribs on passenger tires to absorb some of the shock from curbing the tire. While such curb ribs have been somewhat successful in protecting the white sidewall area of the tires, damage has still been found to occur in such situations. There are also previously known sidewall protectors in the form of shields that are used to cover the sidewall. Yet further, tires have also been previously designed to contain raised ribs about the sidewall band. However, the purpose of the raised ribs has been to improve the aesthetic appearance of the decorative band, giving better definition or resolution to the same. Typically, these ribs are formed as a part of the extrudate containing the decorative sidewall, with a portion of the extrudate being ground or buffed away after curing to expose the sidewall and retain the inner and outer circumferential ribs.

Previously, however, there has been no presentation of a pneumatic tire in which the decorative area of the sidewall is protected by the combination of a protective rib and a decoupling action of the sidewall, allowing the decorative portion of the sidewall to deflect inwardly of the tire upon contact with a substantial vertical surface. Such a combination seeks to protect the sidewall in two different ways, the latter of which is to actually withdraw from the threatening surface that portion of the tire which is sought to be protected.

DISCLOSURE OF THE INVENTION

In light of the foregoing, it is a first aspect of the invention to provide a pneumatic tire wherein a decorative sidewall applique decouples from the tire, deflecting away from the contacted vertical surface upon contact.

Another aspect of the invention is the provision of a pneumatic tire wherein the outer most edge of a decorative applique is protected from curb contact by means of a protective rib which rolls down and up over the exposed outer edge of the applique upon curb contact.

Still a further aspect of the invention is the provision of a pneumatic tire having a decorative applique protected by a protective rib which is undercut by a decoupling groove which is hidden from view by such protective rib.

Another aspect of the invention is the provision of a pneumatic tire having a decorative applique protected by a rib about an edge of said applique nearest the tire bead, such rib protecting the applique in manufacture and handling of the tire.

Yet an additional aspect of the invention is the provision of a pneumatic tire which allows for the use of thin appliques rather than costly extrudates of black and white and/or colored rubber to impart a decorative feature to the sidewall.

The foregoing and other aspects of the invention which will become apparent as the detailed description proceeds are achieved by a pneumatic tire having a tread area, a sidewall area connected to the tread area, and a bead connected to the sidewall area at an end thereof and defining an opening for receiving a wheel, the sidewall area having a neutral exterior sidewall axis defined by a smooth sidewall surface, the improvement, comprising: a decorative applique maintained upon the sidewall area; and a first protective rib maintained upon the sidewall area between the tread area and said decorative applique and extending outwardly of the tire from the neutral sidewall axis, said first protective rib separated from said neutral sidewall axis at a first point adjacent said decorative sidewall applique and extending over said neutral sidewall axis between said first point of separation and a first outer edge of said decorative applique.

Other aspects of the invention are achieved by the improvement in a pneumatic tire having a tread area, a sidewall area connected to the tread area, and a bead connected to the sidewall area at an end thereof and defining an opening for receiving a wheel, the sidewall area having a neutral exterior sidewall axis defined by a smooth sidewall surface, such improvement comprising: a decorative applique maintained upon the sidewall area; and a first protective rib maintained upon the sidewall area between the bead and said decorative applique, said first protective rib separated from the neutral sidewall axis at a first point adjacent said decorative sidewall applique and extending over the neutral sidewall axis between said first point of separation and a first outer edge of said applique.

DESCRIPTION OF DRAWINGS

For a complete understanding of the objects, techniques, and structure of the invention reference should be had to the following detailed description and accompanying drawings wherein.

BEST MODE FOR CARRYING OUT THE INVENTION

Figure 1:
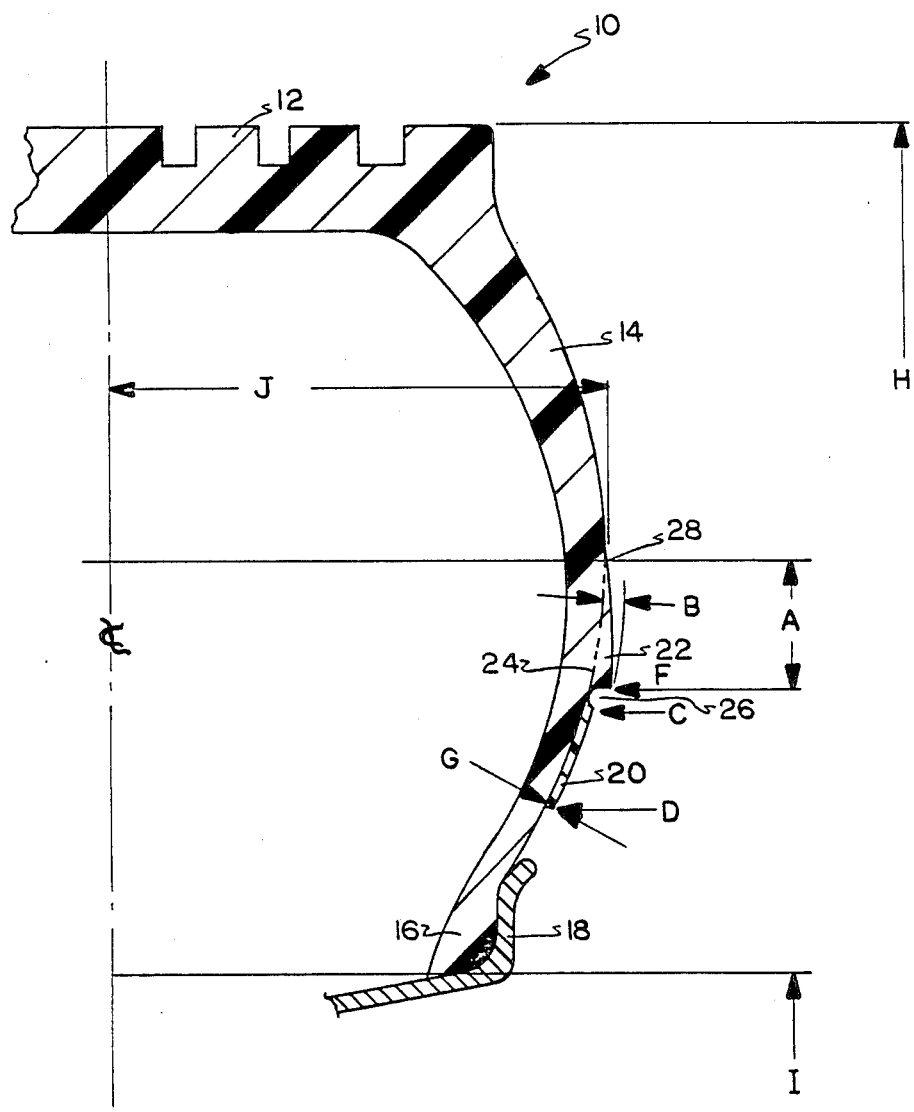
FIG. 1 is a partial sectional view of a tire according to a first embodiment of the invention.

Referring now to the drawings and more particularly FIG. 1, it can be seen that a pneumatic tire according to the invention is designated generally by the numeral 10. The pneumatic tire 10 includes a tread area 12, a sidewall area 14, and a bead area 16 in somewhat standard fashion. The bead area 16 is adapted for mating engagement with the rim of a wheel 18 as shown.

A decorative decal or applique 20 is applied to the sidewall area 14 of the tire as shown in cross section in FIG. 1. It will be understood that the applique 20, in the instance shown, comprises a band which is substantially concentric with the bead 16 of the tire, circumferentially maintained upon the sidewall surface. As mentioned above, the applique 20 may be an extremely thin applique such as an adhered layer of polymeric paint having a thickness on the order of 0.003 inch. It will be understood, however, that the concepts of the invention are equally applicable to decorative appliques 20 which might be imparted by means of the application of a rubber extrudate as known from the prior art.

Protection of the applique 20 is achieved by means of a protective rib 22, provided about the sidewall 14 of the tire 10 concentric with the applique 20. For the purposes of minimizing material use while maintaining physical integrity, the rib 22 is substantially triangular in cross section as shown. It begins at a point 28 flush with the sidewall area 14 of the tire and extends beyond the neutral exterior sidewall axis line 24 to a maximum rib depth shown in the drawing by the letter B. It will be understood that the neutral exterior sidewall axis line 24 is the surface that would be assumed by the sidewall 14 of the tire 10 by a completely smooth (uniform depth) sidewall surface, absent the rib 22 and the applique 20. Of course, it will be appreciated that the rib 22 may be of other geometric cross section consistent with the objects hereof.

A decoupling groove 26 separates the point of maximum depth of the rib 22 and the outer edge of the applique 20. As shown in FIG. 1, the groove 26 interconnects both the rib 22 and the applique 20 and has a maximum depth defined by the bottom thereof which is flush with the neutral exterior sidewall axis line 24. It is, however, contemplated that the groove 26 may extend to a maximum depth short of the neutral exterior sidewall axis line 24.

The rib 22 and decoupling groove 26 act to protect the applique 20 in the following manner. When the sidewall area 14 comes into scuffing contact with a vertical curb surface or the like, the rib 22 is urged radially inward toward the bead 16, covering the outer edge of the applique 20. At the same time, the decoupling groove 26, as its name implies, decouples the sidewall area of the tire at the point of the groove, allowing the sidewall area containing the applique 20 to deflect inwardly of the tire toward the centerline thereof. This deflection further allows the rib 22 to extend over the outer edge of the applique 20. The inward deflection of the sidewall area containing the applique 20 withdraws the applique from the abrasive curb surface, while the rib 22 seals and protects the outer edge thereof. Accordingly, the applique 20 is removed from contacting engagement with the curb surface.

Effectively, the decoupling groove 26 acts like a score line, defining the weakest line in the sidewall area 14, such that any deflection of the sidewall area resulting from forceful contact therewith will be about such score line.

Figure 2:
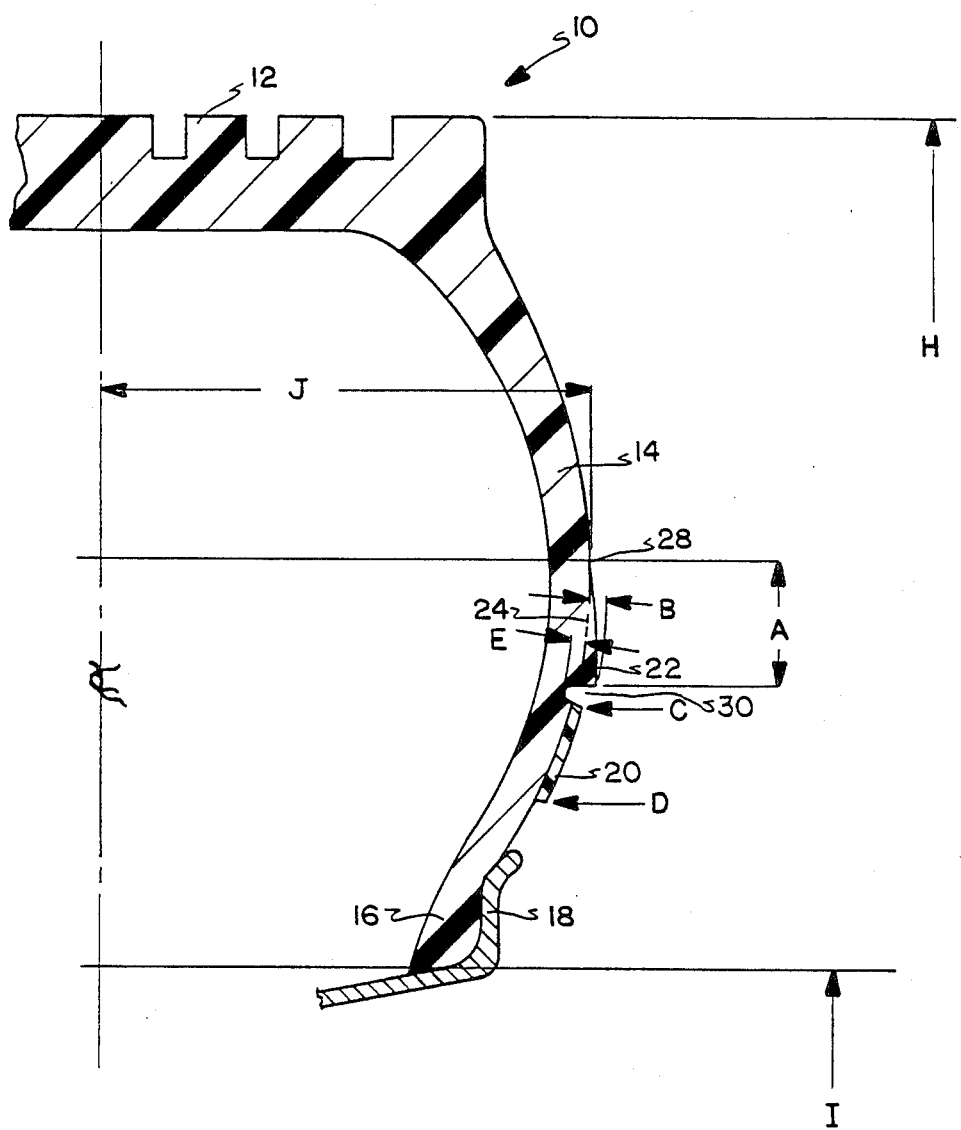
FIG. 2 is a partial sectional view of a tire according to a second embodiment of the invention.

With reference now to FIG. 2, yet another embodiment of the invention may be seen. Here, the tire 10 is substantially similar to that discussed above with respect to FIG. 1, including a tread area 12, sidewall area 14, and bead 16 mating with the rim of a wheel 18. Again, an applique 20 is provided as is a rib 22. However, in the embodiment of FIG. 2, the decoupling groove 30 extends inwardly into the sidewall area 14 and beyond the neutral exterior sidewall axis line 24. This deeper groove, actually in interference with the sidewall area 14, provides an even more definite score line for tire deflection than that realized with the structure of FIG. 1. In all other respects, the structure of the two embodiments is the same.

Certain parameters with respect to the rib 22 and the decoupling grooves 26,30 have been found to exist. By way of example, it has been found that the maximum extension of the rib 22 beyond the outer surface of the applique 20 must be at least 0.150 inch. Within this limitation, other parameters for the design of the protective rib and decoupling groove are given with respect to the dimension shown in FIGS. 1 and 2 according to the following formula:

$$B = [(C - 1.12) \times 0.01] \times 0.71 [Jdefl/(Hdefl - F)/2] + G$$

where:

A = minimum protective rib width = 3.5B

B = minimum protective rib depth above the neutral exterior sidewall axis line

C = inflated outside diameter of applique surface

D = inflated inside diameter of applique surface

E = minimum decoupling groove depth of FIG. 2 where the groove passes into the sidewall beyond the neutral exterior side wall axis line = 0.15B F = outside diameter of widest point of the protective rib height measured through axial line of wheel G = 0.0065(C − D)(minimum)

H = outside tire diameter

Hdefl = deflected tire outside diameter at rated inflation pressure and load on a standard design rim = H/2 + - static loaded radius, where the static loaded radius is the tire axle height at rated load and inflation pressure
I=nominal bead diameter
J=over all tire width
Jdefl=0.85J The minimum decoupling groove width is equal to $(F-C)/2=0.0071(I-2.24)$. The maximum width for the decoupling groove is 0.35 inch. In the foregoing, all dimensions are in inches.

The parameters presented above have been found to effectively allow the applique portion of a sidewall to deflect from the remainder of the sidewall upon rotary scuffing of the sidewall against a vertical surface. They have further been found to allow the rib 22 to extend down over the outer circumferential edge of the applique 20, protecting such edge from peeling action of the curb surface.

A tire according to the foregoing description was tested against an 8 inch high abrasive concrete curb. After fifty complete revolutions with the sidewall of the tire in constant contact with the curb, there was no apparent marring or scuffing of the decorative sidewall applique which was present on the tire in the form of a band.

Figure 3:
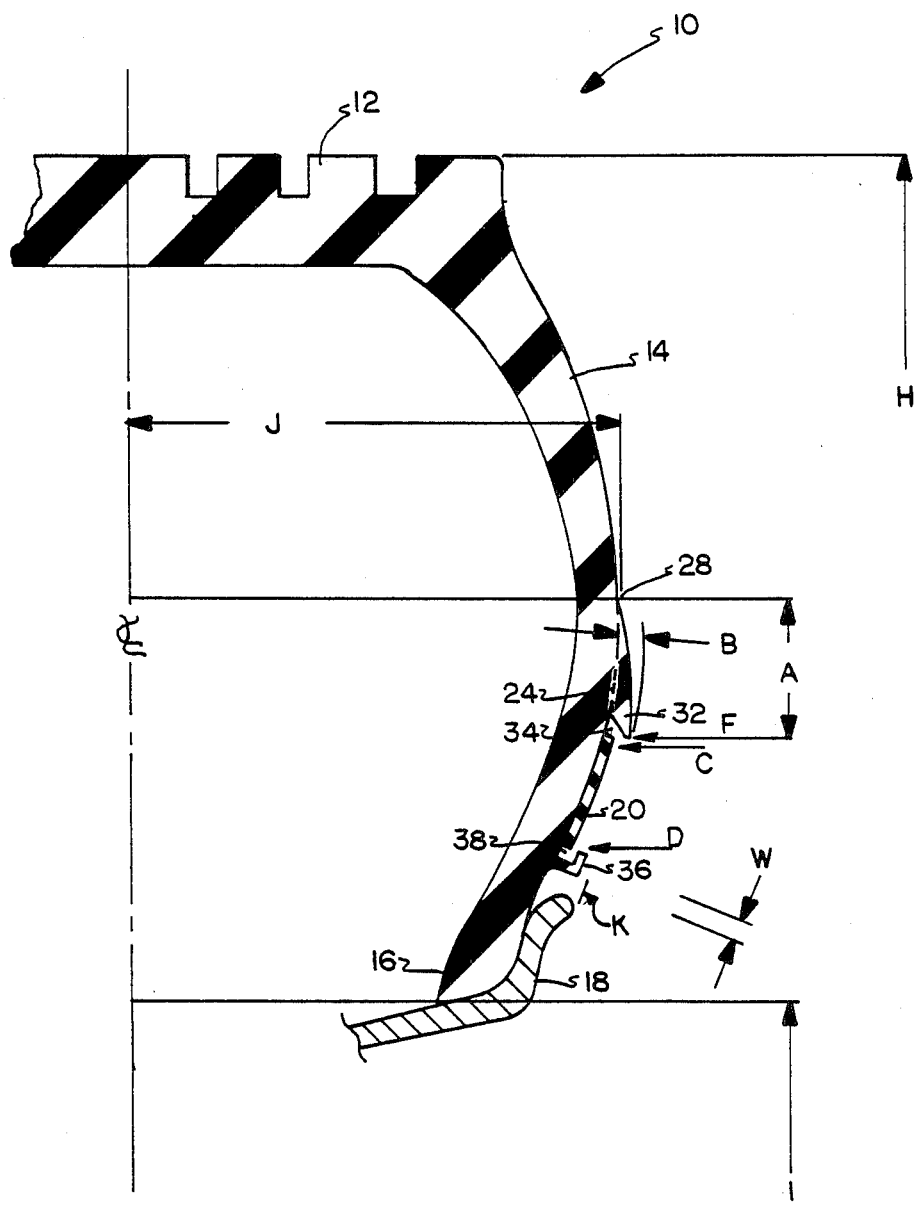
FIG. 3 is a partial sectional view of a tire according to a third embodiment of the invention.

With reference now to FIG. 3, yet another embodiment of the concept of the invention can be seen. Again, the invention is adapted for implementation with a pneumatic tire 10, having a tread area 12 and sidewall 14 thereon. The sidewall 14 extends to an annular bead area 16 which mates with the rim of the wheel 18 as previously discussed. Again, a decal or applique 20 is appropriately adhered to the sidewall area 14 as set forth in copending patent application Ser. No. 766,227, filed Aug. 16, 1985, now U.S. Pat. No. 4,767,481. The polymeric paint layer forming the decal 20 is carried upon a metal ring or other suitable carrier and adhered to the tire during the curing process. Of course, the carrier ring is of greater width than the polymeric paint decal 20, such that the ring extends beyond the defined boundaries of the decal. Accordingly, when the ring is removed after the curing process is completed, the decal 20 remains adhered to the sidewall 14, but a black flash or the like may be developed on either side of the decal 20 as a result of the carrier removal. It is most desirable that this flash be hidden from view. Further, it is desired that the decoupling groove not be noticeable, but hidden from view.

Covering of the flash and hiding of the decoupling groove is achieved by the protective rib 32 as shown in FIG. 3. The decoupling groove 34 undercuts the protective rib 32 along the neutral exterior sidewall axis 24. This undercutting of the decoupling groove 34 allows the decal 34 to be moved adjacent the protective rib, concealing the groove and any flash resulting in the manufacturing process. It will be understood that the steel ring or carrier which receives the applique 20 within the mold is received by the groove 34 during the manufacturing process. Accordingly, flash which develops when the carrier is removed is concealed by the extension of the protective rib 32 over the groove 34.

In implementation, it has been found that the protective technique of the embodiment of FIG. 3 operates in the same manner as that discussed above with respect to FIGS. 1 and 2. Certain constraints, however, have been found to be desirable. It is preferred that the decoupling groove 34 be at least 0.025 inches deep, with the depth measurement being taken along the neutral exterior sidewall axis line 24. It has also been determined that the maximum groove width, taken orthogonal to the axis line 24, is 0.38B, where B is the extension of the protective rib beyond the neutral exterior sidewall axis line. The minimum groove width has been found to be on he order of 0.006 inch.

Also included as a portion of the invention is a lower sidewall rib 36 which may be added at the edge of the decal 20 nearest the bead 16. The rib 36 is included to protect the applique 20 during tire processing and shipment and to again keep rubber molding flash hidden from view. It again will be appreciated that the steel ring or carrier for the applique 20 is received within the groove of the rib 36 during the molding operation and that resultant flash is thus hidden by the rib 36. The rib 36 may be located immediately adjacent the applique 20 or up to 0.6 inch therefrom. As illustrated, the rib 36 is undercut to form a groove 38, which groove receives the steel ring or carrier of the applique 20 during the molding operation. Again, certain constraints are desired with respect to the rib 36 and groove 38. The rib 36 may be undercut by the groove 38 up to 75% of the width W of the rib as taken along the axis line 24. Further, the width W should be at least 50% of the height K as measured normal to the neutral axis 24. The minimum height of the rib 36 is defined by the equation $K_{min}=0.09\,(C-D)/2$.

As before, C=inflated outside diameter of applique surface and D=inflated inside diameter of applique surface.

It should be appreciated by those skilled in the art that the rib 32 and decoupling groove 34 protect the applique 20 upon curbing, scuffing, or the like when the tire 10 is in use upon a vehicle. The rib 36 and groove 38 serve to protect the applique 20 during the manufacturing process and tire handling. Such groove does not serve, in a substantial way, to protect the applique 20 in use. Both ribs 32,36 serve to isolate and obscure any flash which is created during the manufacturing process along the respective sides of the applique 20. Further, the ends of the ribs 34,36 assist in sharply defining the geometric configuration of the applique 20 when optically viewed.

Thus it can be seen that the objects of the invention have been satisfied by the structure presented hereinabove. While in accordance with the patent statutes only the best mode and preferred embodiments of the invention have been presented and described in detail, it is to be understood that the invention is not limited thereto or thereby. Accordingly, for an appreciation of the true scope and breadth of the invention reference should be had to the following claims.

What is claimed is:

1. In a pneumatic tire having a tread area, a sidewall area connected to the tread ares, and a bead connected to the sidewall area at an end thereof and defining an opening for receiving a wheel, the sidewall area having a neutral exterior sidewall axis defined by a smooth sidewall surface, the improvement, comprising:
a decorative applique maintained upon the sidewall area;
a first protective rib maintained upon the sidewall area between the tread area and said decorative applique and extending outwardly of the tire from the neutral sidewall axis, said first protective rib separated from said neutral sidewall axis at a first point of separation adjacent said decorative sidewall applique and having a portion thereof extending laterally over said neutral sidewall axis between said first point of separation and a first outer edge of said decorative applique;

a groove underlying said portion of said first protective rib, said groove causing said applique to deflect inwardly of the tire and draw said first protective rib down over said first edge of said applique upon the sidewall making scuffing contact with a vertical surface, said groove being at least 0.025 inch deep as measured along said neutral sidewall axis, having a maximum width as measured orthogonal to said neutral sidewall axis of 0.38B, where B is the extension of the protective rib beyond said neutral sidewall axis, and having a minimum groove width of 0.006 inch;

a second protective rib maintained upon the sidewall area between the bead and said decorative applique, said second protective rib separated from the neutral sidewall axis at a second point of separation adjacent said decorative sidewall applique and extending over the neutral sidewall axis between said second point of separation and a second outer edge of said decorative applique; and a groove between said second protective rib and the neutral sidewall axis, said groove defined by an undercut of less than 75 percent of the width of said second protective rib.

2. The improvement in a pneumatic tire according to claim 1, wherein said first rib has a substantially triangular cross section.

3. The improvement in a pneumatic tire according to claim 2, wherein said first rib, at a first edge thereof, is substantially flush with the neutral exterior sidewall axis.

4. The improvement in a pneumatic tire according to claim 1, wherein the width of said second protective rib is at least 50 percent of the height of said second protective rib.

5. The improvement in a pneumatic tire according to claim 4, wherein the height of said second protective rib is at least equal to $$0.09\,(C-D)/2,$$

where C is an inflated outside diameter of said applique and D is an inflated inside diameter of said applique.

6. In a pneumatic tire having a tread area, a sidewall area connected to the tread area, and a bead connected to the sidewall area at an end thereof and defining an opening for receiving a wheel, the sidewall area having a neutral exterior sidewall axis defined by a smooth sidewall surface, the improvement, comprising:

a decorative applique maintained upon the sidewall area;

a first protective rib maintained upon the sidewall area between the bead and said decorative applique, said first protective rib separated from the neutral sidewall axis at a first point of separation adjacent said decorative sidewall applique and having a portion thereof extending laterally over the neutral sidewall axis between said first point of separation and a first outer edge of said applique, the width of said first protective rib being at least 50 percent of the height of said first protective rib, and the height of said first protective rib being at least equal to $$0.09\,(C-D)/2,$$

where C is an inflated outside diameter of said applique and D is an inflated inside diameter of said applique; and a groove between said first protective rib and said neutral sidewall axis, said groove defined by an undercut of less than 75% of the width of said first protective rib.

7. The improvement in a pneumatic tire according to claim 6, which further includes a second protective rib maintained upon the sidewall area between the tread area and said decorative applique and extending outwardly of the tire from the neutral sidewall axis, said second protective rib separated from the neutral sidewall axis at a second point adjacent said decorative sidewall applique and extending over the neutral sidewall axis between said second point of separation and a first outer edge of said decorative applique.

8. The improvement in a pneumatic tire according to claim 7, wherein a groove is defined between said second protective rib and the neutral sidewall axis, said groove causing said applique to deflect inwardly of the tire and draw said first protective rib down over said second edge of said applique upon the sidewall making scuffing contact with a vertical surface.

9. The improvement in a pneumatic tire according to claim 8, wherein said groove is at least 0.025 inch deep as measured along the neutral sidewall axis.

10. The improvement in a pneumatic tire according to claim 9, wherein said groove has a maximum width as measured orthogonal to the neutral sidewall axis of 0.38B, where B is the extension of the protective rib beyond the neutral sidewall axis.

* * * * *